United States Patent
Grinberg et al.

(10) Patent No.: US 11,018,978 B1
(45) Date of Patent: May 25, 2021

(54) CONFIGURABLE HASH-BASED LOOKUP IN NETWORK DEVICES

(71) Applicant: Marvell Israel (M.I.S.L) Ltd., Yokneam (IL)

(72) Inventors: Ido Grinberg, Raanana (IL); Ilan Mayer-Wolf, Tel-Aviv (IL); Itzik Abudi, Kfar Saba (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 83 days.

(21) Appl. No.: 16/560,816

(22) Filed: Sep. 4, 2019

Related U.S. Application Data (60) Provisional application No. 62/726,838, filed on Sep. 4, 2018.

(51) Int. Cl.
*H04L 12/743* (2013.01)
*G06F 1/3234* (2019.01)
*H04L 29/06* (2006.01)

(52) U.S. Cl.
CPC ........ *H04L 45/7453* (2013.01); *G06F 1/3243* (2013.01); *H04L 69/22* (2013.01)

(58) Field of Classification Search
CPC ... H04L 45/74; H04L 45/745; H04L 45/7453; H04L 69/22; G06F 1/3203; G06F 1/3234; G06F 1/3243
See application file for complete search history.

(56) References Cited

U.S. PATENT DOCUMENTS

| | | | |
|---|---|---|---|
| 8,738,860 B1 * | 5/2014 | Griffin | G06F 13/4022 711/122 |
| 8,756,424 B2 | 6/2014 | Roitshtein et al. | |
| 9,237,100 B1 | 1/2016 | Mizrahi et al. | |
| 9,876,719 B2 | 1/2018 | Revah et al. | |
| 9,906,592 B1 | 2/2018 | Roitshtein et al. | |
| 2014/0307737 A1 * | 10/2014 | Levy | G06F 16/245 370/392 |
| 2019/0166109 A1 * | 5/2019 | Wang | H04L 9/0838 |
| 2019/0182160 A1 * | 6/2019 | Bengough | H04L 45/38 |
| 2019/0238459 A1 * | 8/2019 | Shmilovici | H04L 45/7457 |
| 2020/0162584 A1 * | 5/2020 | Beckman | H04L 69/22 |
| 2020/0169268 A1 * | 5/2020 | Billa | H03M 7/6011 |

* cited by examiner

*Primary Examiner* — Kevin D Mew (57) ABSTRACT

In a network device, a hash-based lookup system includes a hash generator configured to apply respective hash functions to a lookup key to generate respective hash values. Each hash function corresponds to a respective logical hash bank in a hash table. A number of hash values generated by the hash generator corresponds to the number of logical hash banks in the hash table, and the number of hash values generated by the hash generator is configurable. The hash-based lookup system also includes an address generator that is configured to generate respective addresses to a memory that stores the hash table, the respective addresses within respective address spaces of respective logical hash banks of the hash table. The address generator uses i) a parameter N that specifies the number of logical hash banks in the hash table, and ii) N hash values generated by the hash generator, to generate the respective addresses.

20 Claims, 9 Drawing Sheets

Table 200:
| Block | ID | Ver |
|---|---|---|
| B0 | 202- | 1 |
| B1 | 206- | 1 |
| B2 | 208- | 1 |
| B3 | 210- | 1 |
| B0 | 202- | 2 |
| B1 | 206- | 2 |
| B2 | 208- | 2 |
| B3 | 210- | 2 |
| B0 | 202- | 3 |
| B1 | 206- | 3 |
| B2 | 208- | 3 |
| B3 | 210- | 3 |
| B0 | 202- | 4 |
| B1 | 206- | 4 |
| B2 | 208- | 4 |
| B3 | 210- | 4 |

Interval 204, Table Size

FIG. 2B

Table 212:
| Block | ID | Ver |
|---|---|---|
| B0 | 214- | 1 |
| B1 | 218- | 1 |
| B2 | 220- | 1 |
| B3 | 222- | 1 |
| B4 | 224- | 1 |
| B5 | 226- | 1 |
| B6 | 228- | 1 |
| B7 | 230- | 1 |
| B0 | 214- | 2 |
| B1 | 218- | 2 |
| B2 | 220- | 2 |
| B3 | 222- | 2 |
| B4 | 224- | 2 |
| B5 | 226- | 2 |
| B6 | 228- | 2 |
| B7 | 230- | 2 |

Interval 216, Table Size

FIG. 2C — 232

| Label | Value |
|---|---|
| B0 | 214 |
| B1 | 218 |
| B2 | 220 |
| B3 | 222 |
| B4 | 224 |
| B5 | 226 |
| B6 | 228 |
| B7 | 230 |
| B8 | 234 |
| B9 | 236 |
| B10 | 238 |
| B11 | 240 |
| B12 | 242 |
| B13 | 244 |
| B14 | 246 |
| B15 | 248 |

Table Size

FIG. 2D — 250

| Label | Value | Count |
|---|---|---|
| B0 | 202- | 1 |
| B1 | 206- | 1 |
| B2 | 208- | 1 |
| B3 | 210- | 1 |
| B0 | 202- | 2 |
| B1 | 206- | 2 |
| B2 | 208- | 2 |
| B3 | 210- | 2 |

Interval 206, Table Size

FIG. 2E — 256

| Label | Value | Count |
|---|---|---|
| B0 | 224- | 1 |
| B1 | 228- | 1 |
| B2 | 230- | 1 |
| B3 | 232- | 1 |
| B4 | 234- | 1 |
| B5 | 236- | 1 |
| B6 | 238- | 1 |
| B7 | 240- | 1 |

Table Size

FIG. 2F

| B0 262 | B1 264 | B2 266 | B3 268 |

← 260, Table Size

FIG. 2G

| B0 272 | B1 274 | B2 276 | B3 278 | B4 280 | B5 282 | B6 284 | B7 286 |

← 270, Table Size

CONFIGURABLE HASH-BASED LOOKUP IN NETWORK DEVICES

CROSS-REFERENCES TO RELATED APPLICATIONS

The present application claims the benefit of U.S. Provisional Application No. 62/726,838, entitled "Configurable Multiple Hash Tables (MHT)," filed on Sep. 4, 2018, the disclosure of which is hereby incorporated herein by reference in its entirety.

FIELD OF TECHNOLOGY

The present disclosure relates generally to network devices, and more particularly, to hash lookup tables in network devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Network devices, such as network switches, routers, edge devices and the like, often employ lookup tables that store various information associated with packets processed by the network devices, and a network device performs lookups in the lookup tables for making various processing decisions during processing of packets by the network device. For example, lookup operations may be performed for packet classification, forwarding decisions, quality of service classifications, policy control list applications, and other processing operations generally performed by network devices. In general, a lookup for a packet is performed according to a key associated with or generated for the packet. The key is used to search a table, for example, and information relevant to the packet (e.g., forwarding information for the packet) is retrieved from an entry in the table identified by the key. Some lookup tables are implemented using content addressable memory (CAM). A CAM based table is a fully associative array that generally allows all keys provided to the table to be inserted into the table as long as the maximum number of table entries has not been exceeded. However, while a CAM table allows insertion of all keys provided to the table, CAM based tables generally are expensive in terms of area and power consumption, especially when large size lookup tables are employed.

An alternative implementation of a lookup table utilizes a hash based scheme in which a hash function is applied to a key to determine a location in the hash table at which the key and information associated with the key (e.g., forwarding information) are stored. While hash tables generally are smaller and more efficient compared to CAM implementations, hash tables exhibit inherent collisions when a hash function generates the same hashed values for two or more different keys provided to the hash function. As a result of such collisions, some keys provided to a hash table cannot be inserted into the hash table. Thus, it is difficult to achieve exact match lookup performance when hash tables are employed. Various techniques, such as increasing hash table size, using several hash tables in parallel, or utilizing auxiliary mechanisms to improve the density of values stored in a hash table as well as to resolve hash collisions, have been employed to overcome the inherent deficiencies of conventional hash tables.

SUMMARY OF THE DISCLOSURE

A network device comprises: a plurality of ports; a memory configured to store a hash table, the hash table including a plurality of logical hash banks, wherein a number of logical hash banks in the hash table is configurable; and a packet processor coupled to the plurality of ports and to the memory, the packet processor configured to analyze ingressing packets and to make packet processing decisions for the ingressing packets, the packet processing decisions including a decision to forward an ingressing packet to one or more of the ports, wherein the packet processor comprises a hash-based lookup system. The hash-based lookup system includes: a hash generator configured to apply respective hash functions to a lookup key that includes packet header information from the ingressing packet, to generate respective hash values, wherein each hash function corresponds to a respective logical hash bank in the hash table, wherein a number of hash values generated by the hash generator corresponds to the number of logical hash banks, and wherein the number of hash values generated by the hash generator is configurable; an address generator configured to generate respective addresses to the memory, the respective addresses within respective address spaces of respective logical hash banks of the hash table, wherein the address generator is configured to generate the respective addresses using i) a parameter N that specifies the number of logical hash banks in the hash table, and ii) N hash values generated by the hash generator; and a match identifier configured to i) compare the lookup key with match information in entries respectively retrieved from N logical hash banks of the hash table using the respective addresses, to determine whether match information in any of the retrieved entries matches the lookup key, and ii) when match information in one of the retrieved entries matches the lookup key, output lookup information in the one entry.

In another embodiment, a method is for looking up information in a hash table of a network device for processing an ingressing packet, wherein the hash table includes a plurality of logical hash banks, and wherein a number of logical hash banks in the hash table is configurable. The method includes: applying, at the network device, a plurality of hash functions to a lookup key that includes information from a header of the ingressing packet, wherein respective hash functions among the plurality of hash functions correspond to respective logical hash banks in the hash table; generating, at the network device, a plurality of addresses to a memory that stores the hash table, wherein respective addresses among the plurality of addresses are within respective address spaces of respective logical hash banks of the hash table, and wherein generating the respective addresses includes using i) a parameter N that specifies the number of logical hash banks in the hash table, and ii) N hash values; retrieving, at the network device, entries from N logical hash banks of the hash table using the respective addresses; comparing, at the network device, the lookup key with match information in the retrieved entries to determine whether match information in any of the retrieved entries matches the lookup key; and in response to match information in one of the retrieved entries matching the lookup key, using lookup information in the one entry to process the ingressing packet.

DETAILED DESCRIPTION

Figure 1:
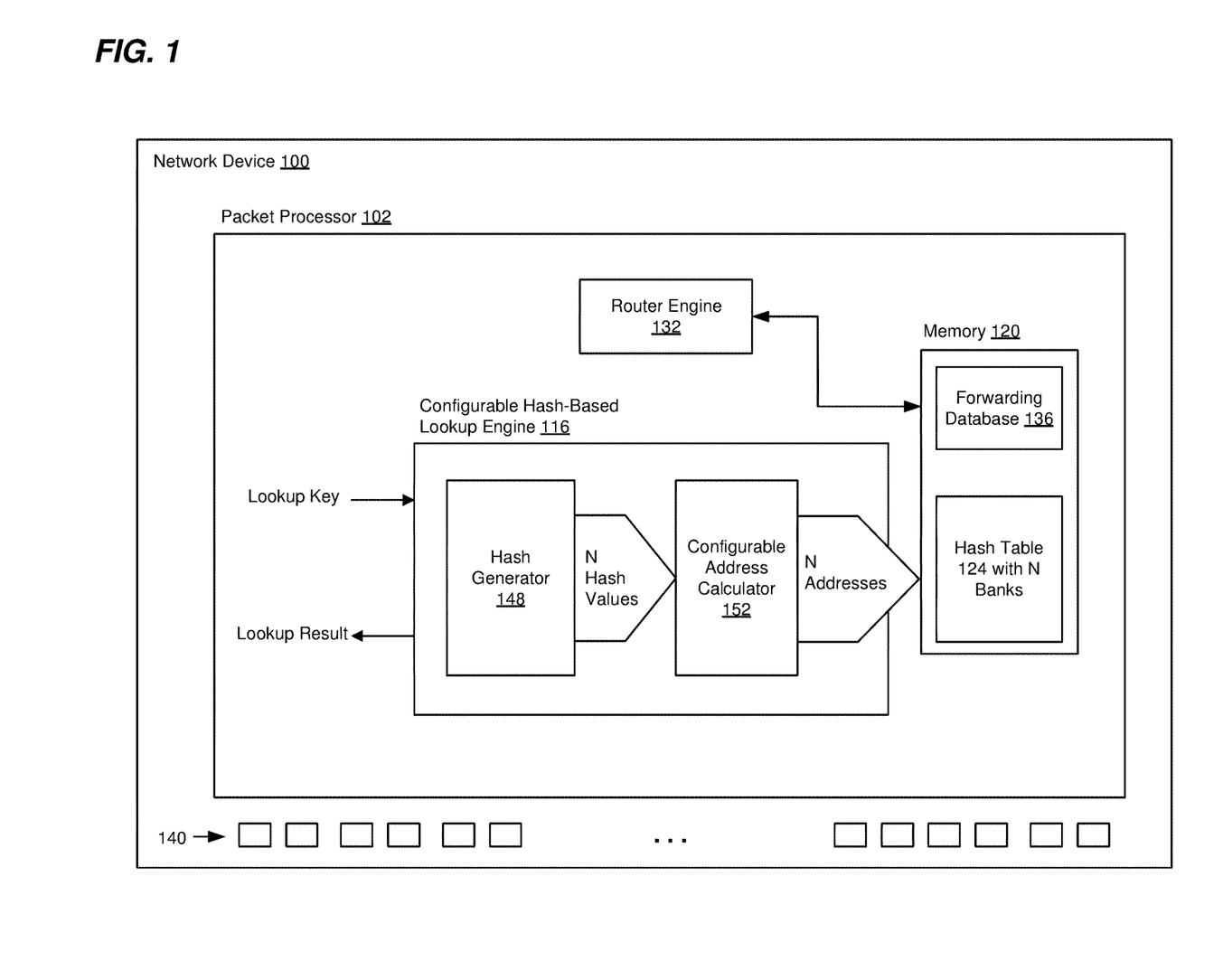
FIG. 1 is a simplified block diagram of an example network device that utilizes a hash table with a plurality of logical hash banks for performing various lookup operations, according to an embodiment.

FIG. 1 is a simplified block diagram of an example network device 100 that utilizes hash-based lookup techniques for performing a lookup operation associated with packets that ingress to the network device 100, in accordance with an embodiment. The network device 100 generally forwards packets among two or more computer systems, network segments, subnets, etc. For example, the network device 100 is a layer-2 switch, in one embodiment. It is noted, however, that the network device 100 is not necessarily limited to a particular protocol layer or to a particular networking technology (e.g., Ethernet technology). For instance, in other embodiments, the network device 100 is suitably a router, a bridge, a virtual private network (VPN) concentrator, etc.

The network device 100 includes a packet processor (or other suitable network processor) 102, and the packet processor 102, in turn, includes a configurable hash-based lookup engine 116 that is configured to use a hash-based technique to lookup processing information regarding packets received by the network device 100 (sometimes referred to herein as "ingressing packets"). In an embodiment, the hash-based lookup engine 116 uses header information in headers of ingressing packets to perform hash-based lookups of processing information. In an illustrative embodiment, the hash-based lookup engine 116 is part of a layer-2 engine, or bridge engine, that uses the hash-based lookup engine 116 to lookup layer-2 forwarding information or media access control (MAC) layer forwarding information for ingressing packets. As another illustrative embodiment, the hash-based lookup engine 116 is part of a tunnel termination engine that uses the hash-based lookup engine 116 to lookup egress interface information for packets that include tunneling headers. As yet another illustrative embodiment, the hash-based lookup engine 116 is part of a classification engine that uses the hash-based lookup engine 116 to lookup classification information for classifying ingressing packets. In other embodiments, the hash-based lookup engine 116 is used for other looking up other processing information for performing other suitable processing operations associated with ingressing packets.

The hash-based lookup engine 116 is coupled to a memory 120. The memory comprises one or more memory devices, such as a random access memory (RAM) such as a dynamic RAM (DRAM) or a static RAM (SRAM), a flash memory, etc.

The memory 120 is configured to store a hash table 124, which in turn stores processing information for packets. The hash table 124 is structured as a plurality of logical hash banks, where a number N of logical hash banks in the hash table 124 is configurable. As will be described in more detail below, the hash-based lookup engine 116 uses a plurality of hash functions, which correspond to respective logical hash banks in the hash table 124, to access the respective hash banks in the hash table 124, according to an embodiment. In some network environments in which the network device 100 operates, using a higher number of logical hash banks increases memory utilization for the hash table 124, whereas in other network environments use of a higher number of logical hash banks does not increase memory utilization or does not increase memory utilization to as great an extent. On the other hand, using higher numbers of logical hash banks in the hash table 124 tends to increase power consumption of the network device 100 as compared to using lower numbers of logical hash banks. In accordance with some embodiments, the network device 100, with the configurable number of logical hash banks, permits a user/administrator/operator to balance improved memory utilization of the hash table 124 (the degree of which may vary depending on the network environment) with power consumption of the network device 100.

In an embodiment, a size of the hash table 124 is also configurable. As an illustrative example, the memory 120 is a shared memory that stores other information (illustrative examples of which are described below), in addition to the hash table 124, that is used by the packet processor 102 to perform other processing operations on packets, and the size of the hash table 124 is configurable to be larger or smaller depending on memory resource needs of the other processing needs, according to an embodiment.

In some embodiments, the memory 120 comprises a plurality of physical memory banks, and one or more of the physical memory banks are configurable to be selectively deactivated to reduce power consumption. In such embodiments, the size of the hash able additionally or alternatively varies (and is configurable) depending on how many (if any) physical memory banks are deactivated.

As an illustrative embodiment, the packet processor 102 includes a router engine 132, and the memory 120 is configured to store a forwarding database 136 that the router engine 132 uses to make forwarding decisions regarding ingressing packets. For instance, the forwarding database 136 stores next hop network address information, and the router engine 132: retrieves next hop network address information from the forwarding database 136 for ingressing packets, and modifies headers of the packets with the next hop network address information before the network device 100 transmits the packets, according to an embodiment. In another embodiment, the memory 120 is also configured to store a longest prefix match (LPM) table (not shown), which the router engine 132 uses to determine LPMs for network addresses in ingressing packets.

In another embodiment, the packet processor 102 omits the router engine 132 and the forwarding database 136. In various other embodiments, in addition to, or instead of, storing forwarding information used by the router engine 132, the memory 120 is configured to store other suitable types of processing information used by the packet processor 102 to process ingressing packets such as tunnel termination forwarding information, packet classification information, etc.

Thus, in accordance with some embodiments in which the memory 120 is shared and stores other packet processing information in addition to the hash table 124, the network device 100, with the configurable size of the hash table 124, additionally or alternatively permits a user/administrator/operator to trade off memory space needs of the lookup engine 116 with the memory space needs of other packet processing functions implemented by the network device 100.

In another embodiment, the memory 120 is a dedicated memory device for storing the hash table 124.

For ease of explanation and to avoid obscuring explanation of the hash-based lookup engine 116 and the memory 120, other processing elements (e.g., a header modification engine, a policing engine, etc.) of the packet processor 102 are not shown. The hash-based lookup engine 116 and other processing elements (such as the router engine 132, if included, and other processing elements not shown) are arranged in any suitable parallel or pipelined arrangements, in various embodiments.

For example, in a pipelined packet processing architecture, a plurality of packet processing elements (PPEs) are arranged in a serial, pipeline arrangement, wherein each PPE is configured to perform one or several packet processing operations for a packet and pass the packet (or a packet descriptor corresponding to the packet) to a next PPE for further processing of the packet, according to an embodiment. In an embodiment, the hash-based lookup engine 116 is one of the pipelined PPEs.

As another example, in a parallel processing arrangement, a plurality of PPEs included in the packet processor 102 are configured to perform, in parallel, processing operations on respective ingressing packets, according to an embodiment. The hash-based lookup engine 116 is one of a plurality of dedicated processing engines external to the parallel processing PPEs and dedicated to performing certain, for example computationally intensive, processing operations for the packets being processed by the parallel processing PPEs, according to an embodiment. For example, the plurality of parallel processing PPEs comprise processors that are configured to execute computer readable instructions stored in one or more non-transitory memories (not shown), whereas the hash-based lookup engine 116 is implemented using hardware circuitry (e.g., on an integrated circuit (IC), an application specific IC (ASIC), etc., in an embodiment.

The network device 100 also includes a plurality of network interfaces (e.g., ports) 140 coupled to the network processor 102, and each of the ports 140 is coupled via a respective communication link to a communication network and/or to another suitable network device within a communication network. Generally speaking, the packet processor 102 is configured to process packets received via ingress ports 140, to determine respective egress ports 140 via which the packets are to be transmitted, and to cause the packets to be transmitted via the determined egress ports 140. In some embodiments, the packet processor 102 processes packet descriptors associated with the packets rather than processing the packets themselves. A packet descriptor includes some information from the packet, such as some or all of the header information of the packet, and/or includes information generated for the packet by the network device 100, in an embodiment. In some embodiments, the packet descriptor includes other information as well such as an indicator of where the packet is stored in a packet memory (not shown) associated with the network device 100. For ease of explanation, the term "packet" herein is used to refer to a packet itself or to a packet descriptor associated with the packet.

The hash-based lookup engine 116 is configured to receive lookup keys corresponding to packets to be processed, and to perform lookups in the hash table 124 using the lookup keys. In particular, hash-based lookup engine 116 is configured to generate a plurality of hash values using a lookup key by applying respective hash functions to the lookup key, where respective hash functions used by the hash-based lookup engine 116 correspond to respective logical hash banks of the hash table 124. The hash-based lookup engine 116 is configured to then use the plurality of hash values, which were generated using respective hash functions, to identify respective memory locations in respective logical hash banks of the hash table 124. In an embodiment, when lookup information for the lookup key is to be stored in the hash table 124, the hash-based lookup engine 116 determines which of the identified locations in the respective logical hash banks of the hash table 124 are empty, and then selects one of the empty locations. The hash-based lookup engine 116 then stores the lookup information in the selected location. Example techniques for storing entries in a hash table comprising multiple logical hash banks are disclosed in U.S. Pat. No. 9,171,030, which is incorporated herein by reference.

Additionally, because a hash function will map multiple different lookup keys to a same hash result, the hash-based lookup engine 116 also stores the lookup key in the selected location, which can be used in a future lookup operation with a future lookup key to determine whether the entry matches the future lookup key. Thus, each of at least some entries of the hash table 124 is configured to store i) match information (e.g., a lookup key), and ii) lookup information corresponding to the lookup key. In an embodiment, if an entry is empty (e.g., no valid lookup information is stored in the entry), the entry is marked to indicate the entry is empty. As merely an illustrative embodiment, if an entry is empty, match information in the entry is set to a default value to indicate the entry is empty. In other embodiments, if an entry is empty, the entry is marked in another suitable manner to indicate the entry is empty.

When lookup information for a lookup key is to be retrieved from the hash table 124, the hash-based lookup engine 116 retrieves respective entries from the identified memory locations (corresponding to respective hash functions) in the respective logical hash banks of the hash table 124. The hash-based lookup engine 116 compares match information in the respective entries to the lookup key to determine if any of the match information in the entries is the same as the lookup key, and when the match information in an entry retrieved from the hash table 124 is the same as the lookup key, the hash-based lookup engine 116 determines that an entry in the hash table 124 matches the lookup key. On the other hand, when none of the match information in the entries retrieved from the hash table 124 is the same as the lookup key, the hash-based lookup engine 116 determines that no entries in the hash table 124 match the lookup key. In an embodiment, when the hash-based lookup engine 116 determines that an entry in the hash table 124 matches the lookup key, the hash-based lookup engine 116 provides the lookup information in the matching entry in the hash table 124 as a lookup result for the lookup key.

The hash-based lookup engine 116 includes a hash generator 148 that is configured to generate a plurality of hash values for a lookup key by applying respective hash functions to the lookup key, where respective hash functions used by the hash generator 148 correspond to respective logical hash banks of the hash table 124. In an embodiment, the hash generator 148 is configurable to generate N hash values using N hash functions, where N is the configurable number of logical hash banks of the hash table 124.

A configurable address calculator 152 is configured to generate respective addresses using respective hash values generated by the hash generator 148, the respective addresses corresponding to respective logical hash banks of the hash table 124. As will be described in more detail below, because an address space of a logical hash bank varies depending on how many hash banks are included in the hash table 124, the configurable address calculator is configured to accommodate such variations. Additionally, if the size of the hash table 124 is configurable, the address space of a logical hash bank will also vary depending on the size of the hash table 124. Thus, the address calculator 152 is configurable to generate addresses for a hash table to span an address of a logical hash bank that varies depending i) on how many hash banks are included in the hash table 124 and ii) optionally on a size of the hash table 124.

Figure 2A:
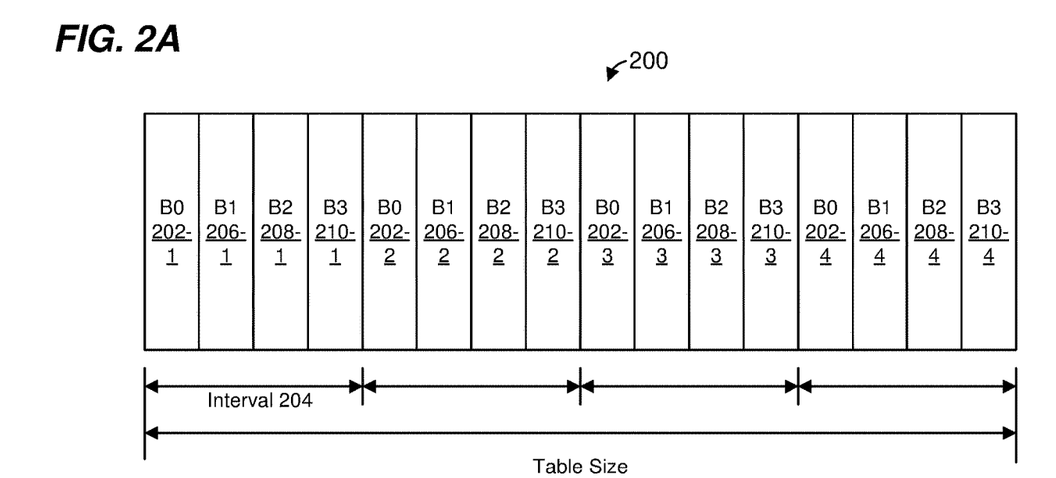
FIG. 2A is a simplified diagram of an example hash table with four logical hash banks, according to an embodiment.

FIG. 2A is a simplified diagram of a hash table 200 stored in the memory 120, according to an illustrative embodiment. The hash table 200 is of a particular size and comprises four logical hash banks, denoted in FIG. 2A as B0, B1, B2, and B3. Bank B0 is striped across multiple memory segments 202 at an interval 206. Logical hash bank B1 is striped across multiple memory segments 206 at the interval 204. Logical hash bank B2 is striped across multiple memory segments 208 at the interval 204. Logical hash bank B3 is striped across multiple memory segments 210 at the interval 204.

Figure 2B:
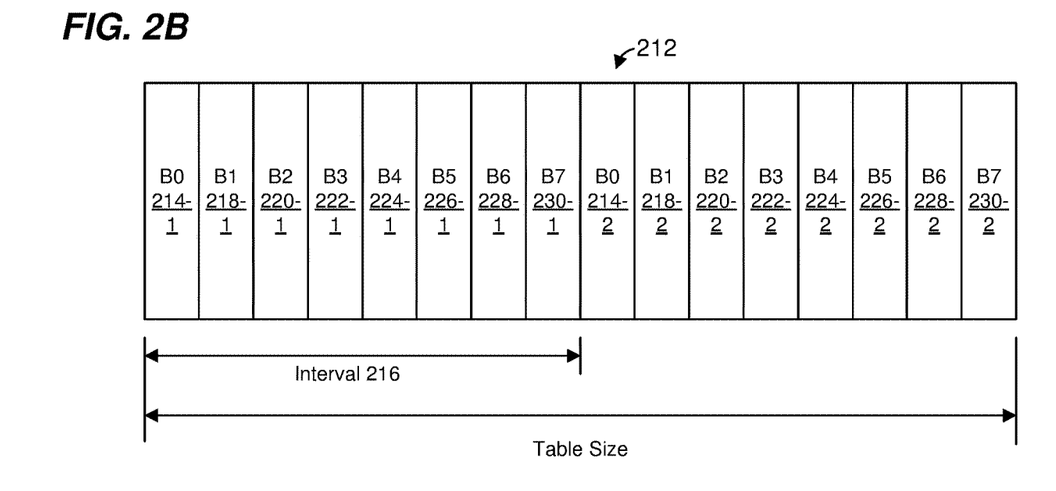
FIG. 2B is a simplified diagram of an example hash table with eight logical hash banks, according to another embodiment.

FIG. 2B is a simplified diagram of another hash table 212 stored in the memory 120, according to another illustrative embodiment. The hash table 212 has the same size as the hash table 200 of FIG. 2A, but comprises eight logical hash banks, denoted in FIG. 2B as B0, B1, B2, B3, B4, B5, B6, and B7. Logical hash bank B0 is striped across multiple memory segments 214 at an interval 216. Logical hash bank B1 is striped across multiple memory segments 218 at the interval 216. Logical hash bank B2 is striped across multiple memory segments 220 at the interval 216. Logical hash bank B3 is striped across multiple memory segments 222 at the interval 216. Logical hash bank B4 is striped across multiple memory segments 224 at the interval 216. Logical hash bank B5 is striped across multiple memory segments 236 at the interval 216. Logical hash bank B6 is striped across multiple memory segments 228 at the interval 216. Logical hash bank B7 is striped across multiple memory segments 230 at the interval 216.

Referring now the FIGS. 2A and 2B, the address spaces of B0-B3 in the hash table 200 are different from the address spaces of B0-B3 in the hash table 212. For example, the interval 204 between memory segments of logical hash banks in the hash table 200 is smaller than the interval 236 between memory segments of logical hash banks in the hash table 212. As another example, the number of memory segments in each logical hash bank is larger in the hash table 200 than the number of memory segments in each logical hash bank in the hash table 212.

Figure 2C:
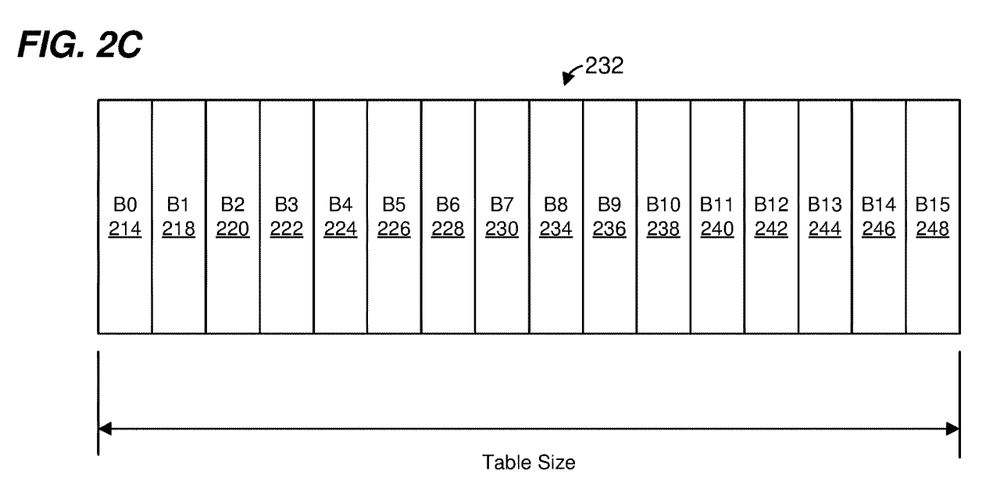
FIG. 2C is a simplified diagram of an example hash table with sixteen logical hash banks, according to another embodiment.

FIG. 2C is a simplified diagram of another hash table 232 stored in the memory 120, according to another illustrative embodiment. The hash table 232 has the same size as the hash table 200 of FIG. 2A and the hash table 212 of FIG. 2B, but comprises sixteen logical hash banks, denoted in FIG. 2C as B0, B1, B2, B3, B4, B5, B6, B7, B8, B9, B10, B11, B12, B13, B14, and B15.

Referring now the FIGS. 2A-C, the address spaces of B0-B3 in the hash table 232 is different from the address spaces of B0-B3 in the hash table 200 and from the address spaces of B0-B3 in the hash table 212. For example, each logical hash bank in the hash table 232 is not striped across multiple memory segments, i.e., each logical hash bank consists of a single memory segment.

Figure 2D:
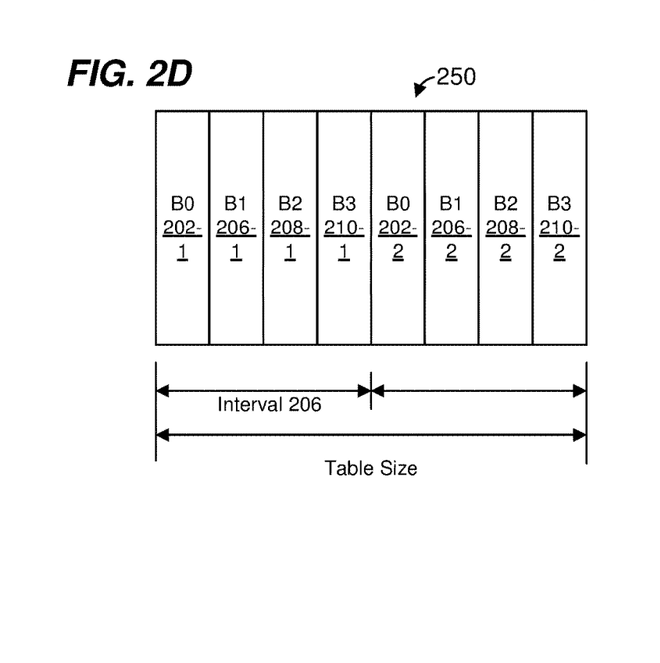
FIG. 2D is a simplified diagram of another example hash table with four logical hash banks, according to an embodiment.

FIG. 2D is a simplified diagram of another hash table 250 stored in the memory 120, according to another illustrative embodiment. The hash table 250 is similar to the hash table 200 of FIG. 2A, but the hash table 250 has a smaller size than the hash table 200. Referring now the FIGS. 2A and 2D, the address spaces of B0-B3 in the hash table 200 are different from the address spaces of B0-B3 in the hash table 250. For example, although the interval 204 between memory segments of logical hash banks in the hash table 200 is the same as the interval 204 between memory segments of logical hash banks in the hash table 250, the number of memory segments in each logical hash bank is larger in the hash table 200 than the number of memory segments in each logical hash bank in the hash table 250.

Figure 2E:
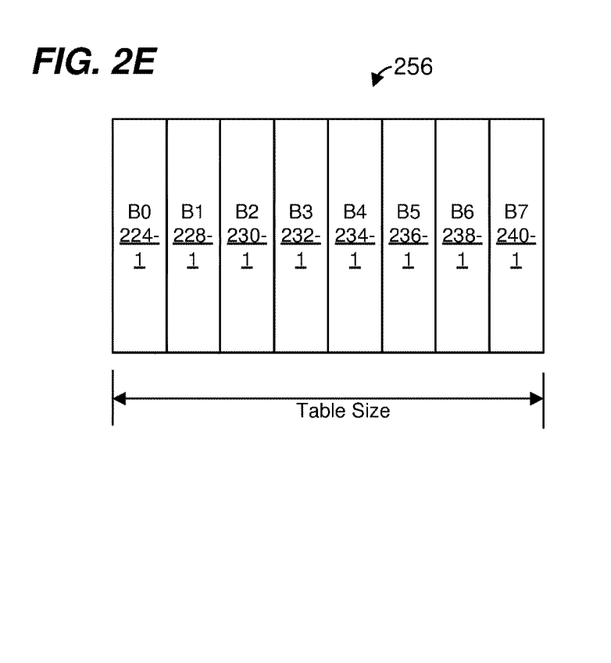
FIG. 2E is a simplified diagram of another example hash table with eight logical hash banks, according to another embodiment.

FIG. 2E is a simplified diagram of another hash table 256 stored in the memory 120, according to another illustrative embodiment. The hash table 256 is similar to the hash table 212 of FIG. 2B, but the hash table 256 has a smaller size than the hash table 212. Referring now the FIGS. 2B and 2E, the address spaces of B0-B7 in the hash table 212 are different from the address spaces of B0-B7 in the hash table 256. For example, each logical hash bank in the hash table 212 includes multiple memory segments, whereas each logical hash bank in the hash table 256 consists of a single memory segment.

Figure 2F:
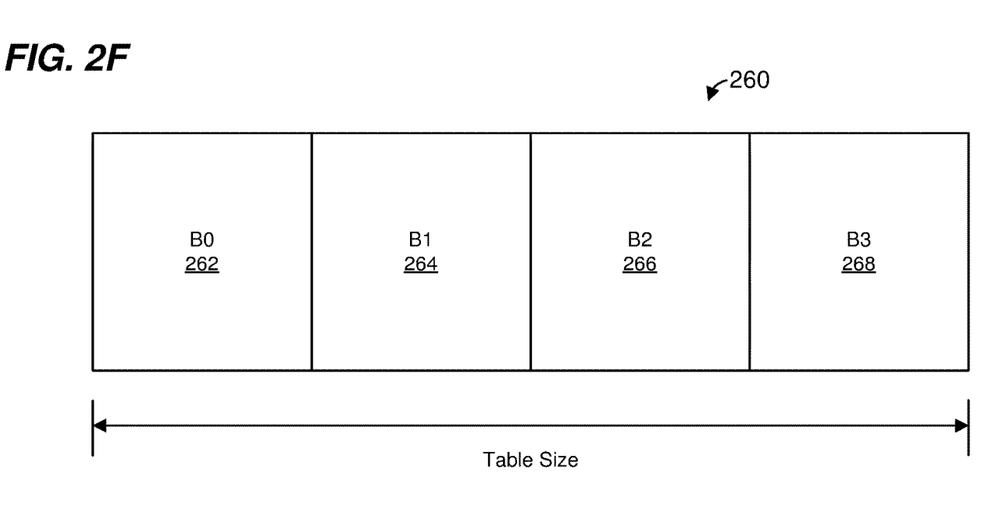
FIG. 2F is a simplified diagram of another example hash table with four logical hash banks, according to an embodiment.

FIG. 2F is a simplified diagram of another hash table 260 stored in the memory 120, according to another illustrative embodiment. The hash table 260 is of a particular size and comprises four logical hash banks, denoted in FIG. 2F as B0, B1, B2, and B3. Logical hash bank B0 consists of a single memory segment 262. Logical hash bank B1 consists of a single memory segment 264. Logical hash bank B2 consists of a single memory segment 266. Logical hash bank B3 consists of a single memory segment 268.

Figure 2G:
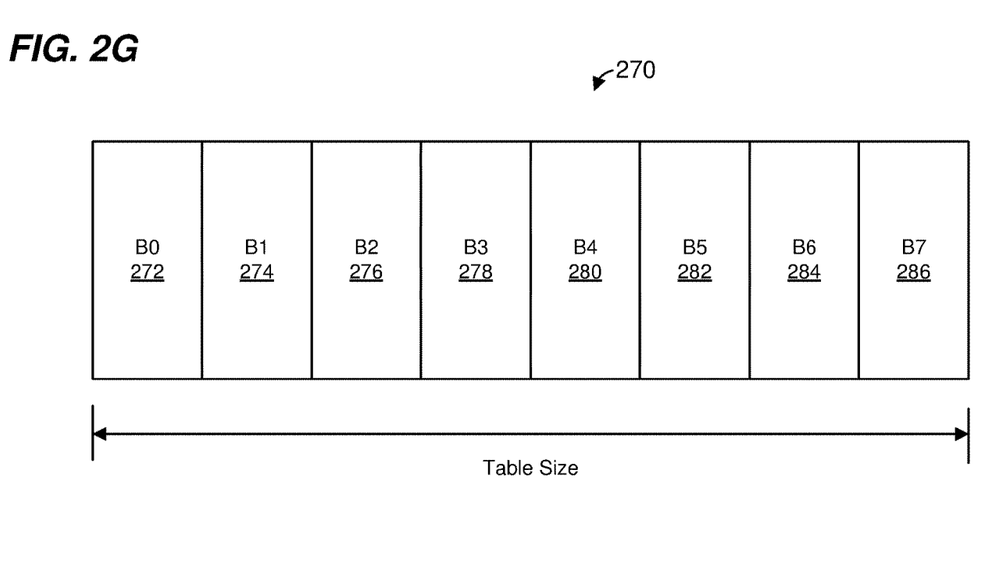
FIG. 2G is a simplified diagram of another example hash table with eight logical hash banks, according to another embodiment.

FIG. 2G is a simplified diagram of another hash table 270 stored in the memory 120, according to another illustrative embodiment. The hash table 270 has the same size as the hash table 260 of FIG. 2F, but comprises eight logical hash banks, denoted in FIG. 2G as B0, B1, B2, B3, B4, B5, B6, and B7. Logical hash bank B0 consists of a single memory segment 272. Logical hash bank B1 consists of a single memory segment 274. Logical hash bank B2 consists of a single memory segment 276. Logical hash bank B3 consists of a single memory segment 278. Logical hash bank B4 consists of a single memory segment 280. Logical hash bank B5 consists of a single memory segment 282. Logical hash bank B6 consists of a single memory segment 284. Logical hash bank B7 consists of a single memory segment 286.

Referring now the FIGS. 2F and 2G, the address spaces of B0-B3 in the hash table 260 are different from the address spaces of B0-B3 in the hash table 270. For example, a size of the address space of B0 in hash table 260 is larger than a size of the address space of B0 in hash table 270.

Figure 2H:
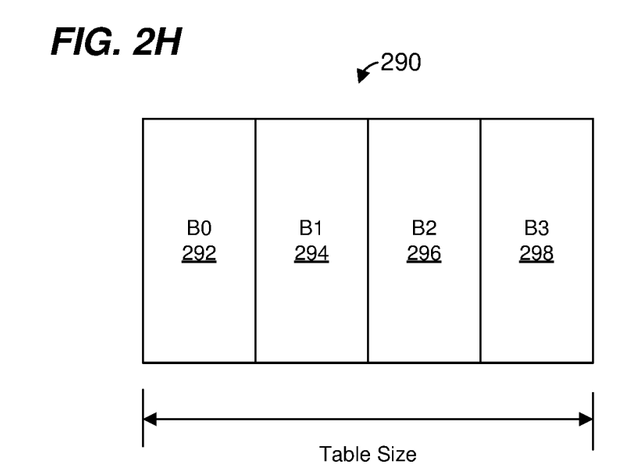
FIG. 2H is a simplified diagram of another example hash table with four logical hash banks, according to an embodiment.

FIG. 2H is a simplified diagram of another hash table 290 stored in the memory 120, according to another illustrative embodiment. The hash table 290 is similar to the hash table 260 of FIG. 2F, but the hash table 290 has a smaller size than the hash table 260. Referring now the FIGS. 2F and 2H, the address spaces of B0-B3 in the hash table 290 are different from the address spaces of B0-B3 in the hash table 260. For example, a size of the address space of B0 in hash table 260 is larger than a size of the address space of B0 in hash table 290.

As can be seen in the example simplified hash tables of FIGS. 2A-G, an address space of a logical hash bank will vary depending on how many hash banks are included in the hash table of a given size. Additionally, if the size of the hash table is configurable, the address space of a logical hash bank will also vary depending on the size of the hash table.

Figure 3A:
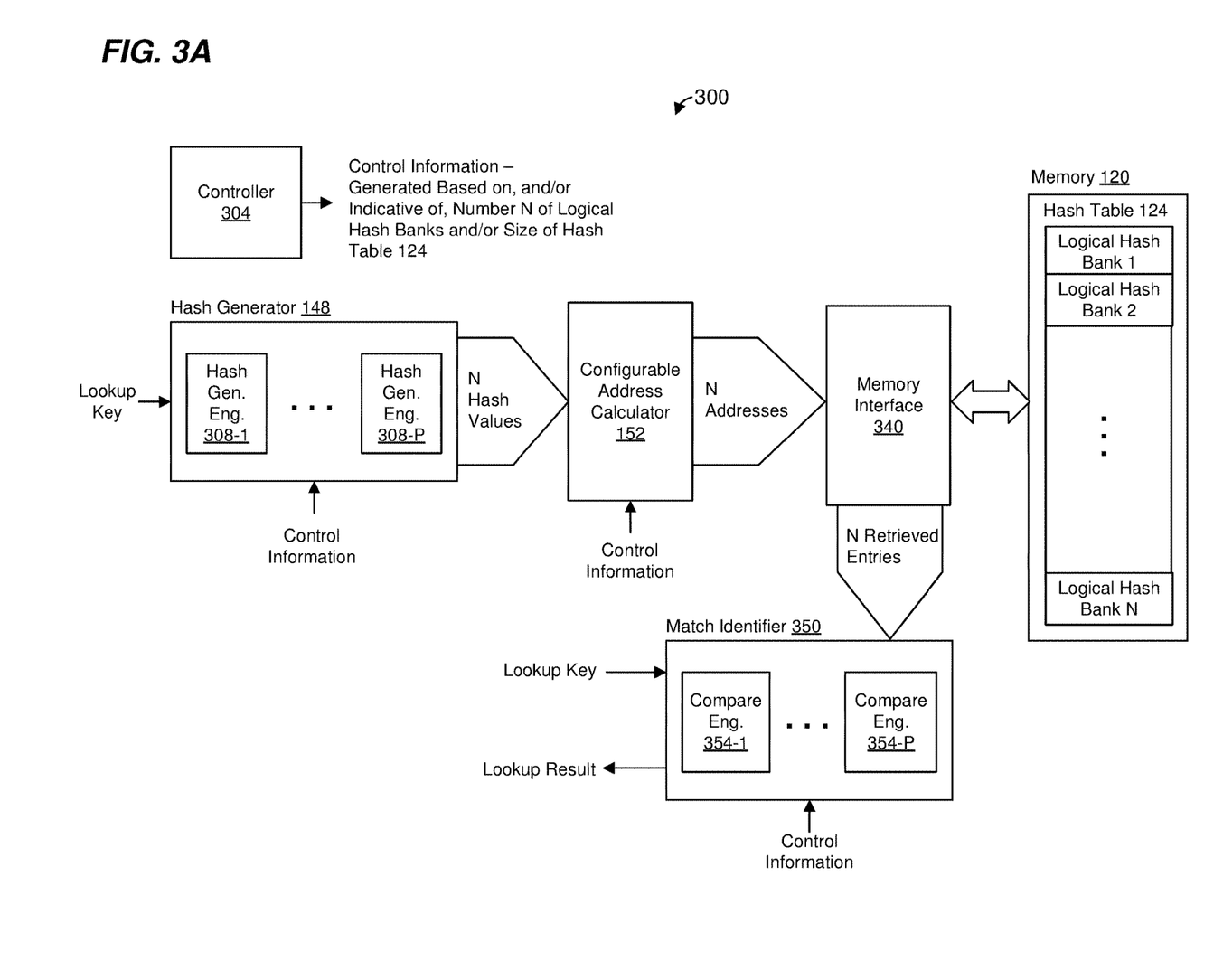
FIG. 3A is a simplified diagram of a hash-based lookup engine of the network device of FIG. 1, according to an embodiment.

FIG. 3A is a simplified diagram of an example configurable hash-based lookup engine 300, according to an embodiment. The hash-based lookup engine 300 is used as the configurable hash-based lookup engine 116 in the network device 100 of FIG. 1, in an embodiment. In other embodiments, the configurable hash-based lookup engine 116 in the network device 100 of FIG. 1 is another suitable hash-based lookup engine different from the configurable hash-based lookup engine 300 of FIG. 3. In other embodiments, the configurable hash-based lookup engine 300 is included in another suitable network device different from the network device 100 of FIG. 1.

The hash-based lookup engine 300 comprises a controller 304 that is configured to generate control information. In an embodiment, the control information is for configuring components of the hash-based lookup engine 300 according to a number of logical hash banks in the hash table 124. In an embodiment, the control information is for configuring components of the hash-based lookup engine 300 according to a size of the hash table 124. In an embodiment, the control information is for configuring components of the hash-based lookup engine 300 according to i) a number of logical hash banks in the hash table 124, and ii) a size of the hash table 124.

In an embodiment, the controller 304 is configured to receive a number of banks parameter that indicates the number N of logical hash banks in the hash table 124, and to generate the control information using the number of banks parameter. In another embodiment, the controller 304 is configured to receive a table size parameter that indicates the size of the hash table 124, and to generate the control information using the table size parameter. In an embodiment, the controller 304 is configured to receive i) the number of banks parameter, and ii) the table size parameter, and is configured to generate the control information using i) the number of banks parameter, and ii) the table size parameter.

In another embodiment, the controller 304 is configured to determine the number of banks parameter (e.g., based on user input), and the control information includes the number of banks parameter. In another embodiment, the controller 304 is configured to determine the table size parameter (e.g., based on user input), and the control information includes the table size parameter. In an embodiment, the controller 304 is configured to determine i) the number of banks parameter, and ii) the table size parameter, and the control information includes i) the number of banks parameter, and ii) the table size parameter.

In an embodiment, the controller 304 comprises logic circuitry configured to generate the control information. In an embodiment, the controller 304 is implemented by processor (not shown) executing machine-readable instructions stored in a memory (not shown), where the machine-readable instructions, when executed by the processor, cause the processor to generate the control information.

The hash-based lookup engine 300 also comprises the configurable hash generator 148 (FIG. 1). As discussed above, the hash generator 148 is configured to generate a plurality of hash values by applying respective hash functions to a lookup key, where respective hash functions used by the hash generator 148 correspond to respective logical hash banks of the hash table 124. In an embodiment, the hash generator 148 is configured according to the control information from the controller 304 to generate N hash values using N hash functions that correspond to N respective logical hash banks of the hash table 124.

In an embodiment, the hash generator 148 comprises a plurality of hash generator engines 308. In an embodiment, the hash generator 148 comprises P hash generator engines 308, where P is greater than or equal to a maximum number of logical hash banks of the hash table 124 that is permitted by the hash-based lookup engine 300 (e.g., a maximum permissible value of N). In an embodiment, each hash generator engine 308 is configured to apply a respective hash function to the lookup key to generate a respective hash value.

Figure 3B:
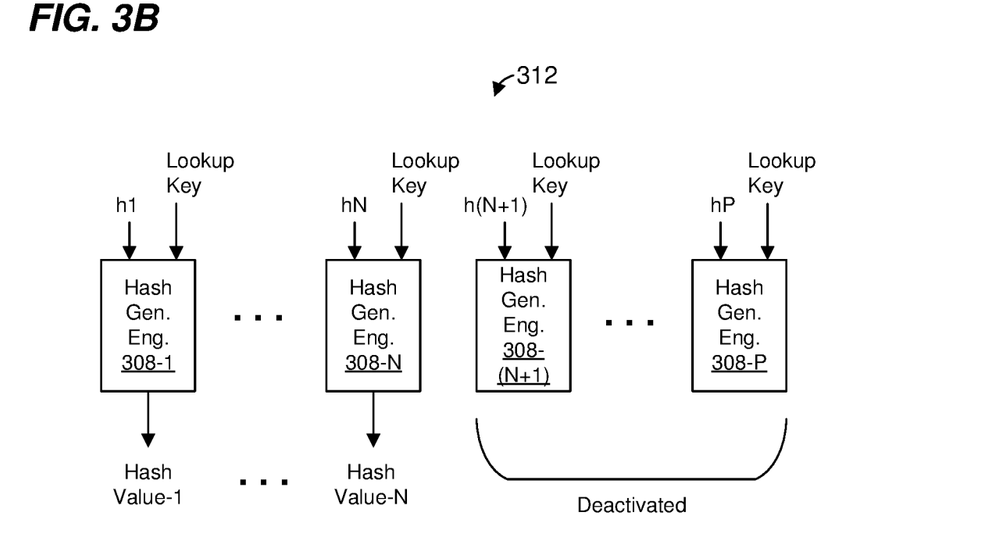
FIG. 3B is a simplified diagram of a plurality of hash generator engines used in the hash-based lookup engine of FIG. 3A, according to an embodiment.

FIG. 3B is a diagram of a set 312 of hash generator engines 308 included in the hash generator 148, according to an embodiment. The set 312 of hash generator engines 308 comprises P hash generator engines 308. Each hash generator engine 308 is configured to apply a respective hash function (h1, h2, . . . , hP) to the lookup key to generate a respective hash value.

At least some of the hash generator engines 308 in the set 312 are configurable to be selectively deactivated to conserve power, according to an embodiment. Deactivating a hash generator engine 308 comprises putting the hash generator engine 308 in a low power state, according to an embodiment.

In an embodiment, when N logical hash banks are to be used, where N<P, N hash generator engines 308 are used to generate N respective hash values using N respective hash functions. Additionally, one or more remaining hash generator engine(s) 308 are deactivated.

Referring now to FIGS. 3A and 3B, control information generated by the controller 304 indicates one or both of i) how many hash values should be generated by the hash generator 148, and ii) how many hash generator engines 308 in the set 312 should be deactivated, if any, according to an embodiment. In one illustrative embodiment, the control information generated by the controller 304 includes the number of banks parameter, and the hash generator 148 is configured i) to receive the number of banks parameter, and ii) if N<P, to deactivate P-N hash generator engines 308 so that N hash generator engines 308 remain activated to generate N hash values.

In another embodiment, the hash generator 148 comprises a number of hash generator engines 308 that is less than N for at least some values of N, and when the number of hash generator engines 308 is less than N, at least some of the hash generator engines 308 are time shared to generate multiple hash values using the lookup key and multiple hash functions. As merely an illustrative example, one hash generator engine 308 is time shared to generate multiple hash values by applying different hash functions (e.g., h1, h2, . . . ) at different times to a same lookup key, according to an embodiment. In at least some such embodiments, if not all of the hash generator engines 308 are needed to generate the N hash values, one or more of the hash generator engines 308 are deactivated to save power. In such embodiments, control information generated by the controller 304 indicates one or both of i) how many hash values should be generated by the hash generator 148, and ii) how many hash generator engines 308 should be deactivated, if any, according to an embodiment. In one illustrative embodiment, the control information generated by the controller 304 includes the number of banks parameter, and the hash generator 148 is configured i) to receive the number of banks parameter, and ii) when all of the hash generator engines 308 are not needed to generate N hash values, to deactivate an appropriate number of hash generator engines 308.

In another embodiment, the hash generator 148 comprises a single hash generator engine 308 that is time shared to generate N hash values using the lookup key and N hash functions. For instance, the single hash generator engine 308 is time shared to generate multiple hash values by applying N hash functions (e.g., h1, h2, . . . , hN) at different times to a same lookup key. In at least some such embodiments, when N is decreased the single hash generator 308 consumes less power generating hash values as compared to when N is larger.

Referring now to FIG. 3A, the address calculator 152 receives the N hash values generated by the hash generator 148, where each hash value corresponds to a respective logical hash bans in the hash table 124. The address calculator 152 generates N addresses into the memory 120 using the N hash values, where the N addresses correspond to N respective logical hash banks in the hash table 124.

As discussed above with respect to FIGS. 2A-G, the address space of a particular logical hash bank will vary depending on N, and optionally on the size of the hash table 124. The address calculator 152 is configurable to generate addresses, using the hash values, so that the generated addresses are within respective address spaces of the logical hash banks for different values of N, and optionally for different sizes of the hash table 124. In an embodiment, control information generated by the controller 304 controls the address calculator 152 to generate addresses so that the generated addresses are within respective address spaces of the logical hash banks for different values of N, and optionally for different sizes of the hash table 124. In one illustrative embodiment, the control information generated by the controller 304 includes i) the number of banks parameter, and ii) optionally the table size parameter, and the address calculator 152 is configured generate addresses using i) hash values from the hash generator 148, ii) the number of banks parameter, and iii) optionally the table size parameter, so that the generated addresses are within respective address spaces of the logical hash banks.

Figure 3C:
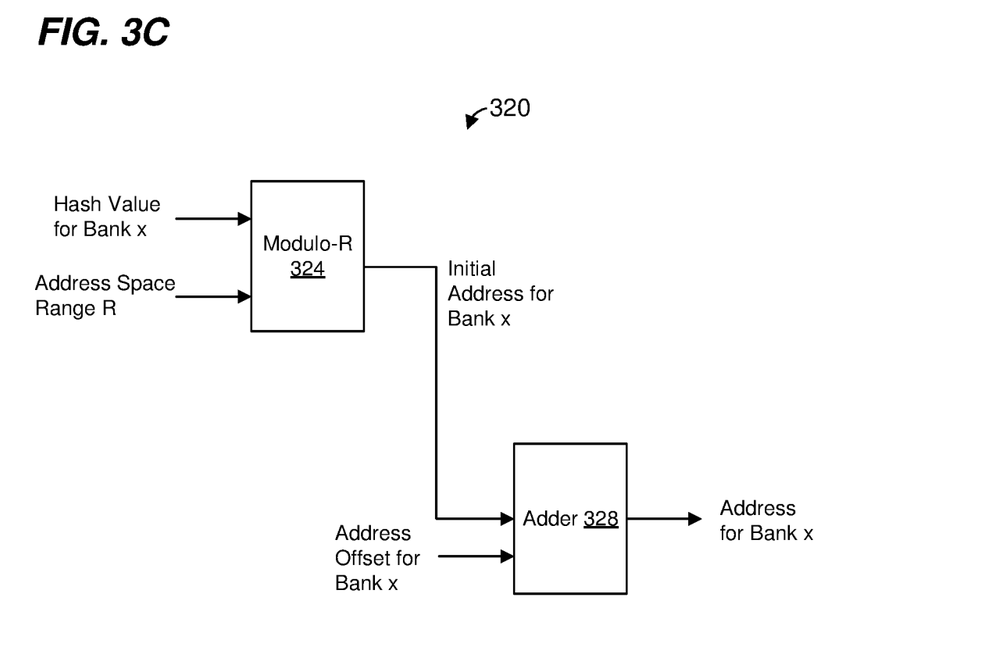
FIG. 3C is a simplified diagram of an address calculator used in the hash-based lookup engine of FIG. 3A, according to an embodiment.

FIG. 3C is a simplified diagram of an example address calculator engine 320 included in the address calculator 152, according to an embodiment. The address calculator engine 320 is configured to use the address calculator engine 320 to generate an address for a logical hash bank x using a hash value from the hash generator 148 corresponding to the hash bank x.

In an embodiment, the address calculator 152 is configured to determine an address space range size R for each logical hash bank. In an embodiment, the address calculator 152 is configured to determine the address space range size R using i) the number of banks parameter, and ii) optionally the table size parameter. In an embodiment, the range of possible values for each hash value generated by the hash generator 148 is larger than the maximum of R, and the address calculator 152 is configured to perform a modulo-R operation on the hash value the hash generator 148. For example, the address calculator engine 320 includes a modulo-R calculator 324 that is configured to i) receive a parameter R, ii) receive the hash value for a logical hash bank x, and iii) perform a modulo-R operation on the hash value to generate an output. The output of the address calculator engine 320 is referred to as an "initial address" for the logical hash bank x, and is a value in the range 0-R, according to an embodiment.

In an embodiment, the address calculator 152 is also configured to determine an address offset for each logical hash bank. In some embodiments in each logical hash bank is striped across multiple memory segments such as discussed above with reference to FIGS. 2A-C, the value of the address offset varies depending on a value of the initial address output by the modulo-R calculator 324. In some embodiments in which each logical hash bank consists of a single memory segment such as discussed above with reference to FIGS. 2F-G, the value of the address offset is fixed for all values of the initial address output by the modulo-R calculator 324. The address calculator engine 320 includes an adder 328 configured to sum the determined address offset and the initial address output by the modulo-R calculator 324 to generate an address for the hash bank x.

In other embodiments, the address calculator 152 does not include the example address calculator engine 320 of FIG. 3C and calculates respective addresses for the hash values generated by the hash generator 148 in a different suitable manner.

Referring again to FIG. 3A, the N addresses generated by the address calculator 152 are provided to a memory interface 340. The memory interface 340 retrieves N respective entries from N respective locations in the N respective logical hash tables using the N addresses from the address calculator 152. As discussed above, each entry is configured to store i) match information (e.g., a lookup key), and ii) lookup information.

The N retrieved entries are provided to a match identifier 350. The match identifier 350 is configured to compare match information in each of at least some of the N retrieved entries to the lookup key to determine if match information in any of the N retrieved entries matches the lookup key. In an embodiment in which match information in empty entries are set to a default value to indicate the entries are empty, the match identifier 350 compares the match information from empty entries to the lookup key. In another embodiment in which empty entries are otherwise marked to indicate the entries are empty, the match identifier 350 does not compare match information from empty entries to the lookup key.

When the match identifier 350 determines that match information in one of the N retrieved entries matches the lookup key, the match identifier 350 outputs lookup information from the one retrieve entry.

In an embodiment, match identifier 350 includes a plurality of comparator engines 354. In an embodiment, the match identifier 350 comprises P comparator engines 354, where P is greater than or equal to the maximum number of logical hash banks of the hash table 124 that is permitted by the hash-based lookup engine 300 (e.g., a maximum permissible value of N). In an embodiment, each comparator engine 354 is configured to compare match information from a respective retrieve entry to the lookup key to determine whether the match information from the respective retrieve entry is the same as the lookup key (e.g., determines whether the match information from the respective retrieve entry matches the lookup key).

Figure 3D:
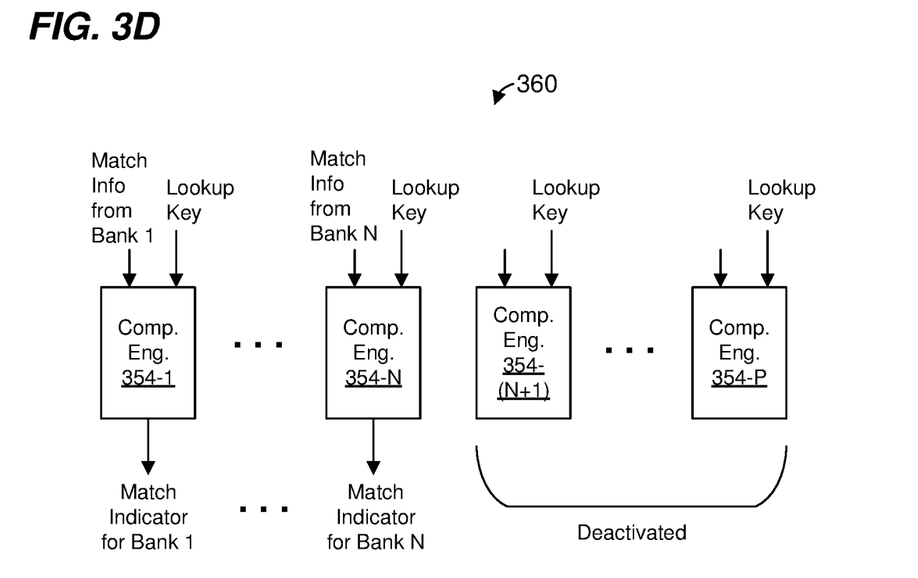
FIG. 3D is a simplified diagram of a plurality of comparator engines used in the hash-based lookup engine of FIG. 3A, according to an embodiment.

FIG. 3D is a diagram of a set 360 of comparator engines 354 included in the match identifier 350, according to an embodiment. The set 360 of comparator engines 354 comprises P comparator engines 354. Each comparator engine 354 is configured to compare match information from a respective retrieved entry to the lookup key to determine whether the match information from the respective retrieved entry matches the lookup key.

At least some of the comparator engines 354 in the set 360 are configurable to be selectively deactivated to conserve power, according to an embodiment. Deactivating a comparator engine 354 comprises putting the comparator engine 354 in a low power state, according to an embodiment.

In an embodiment, when N logical hash banks are to be used, where N<P, N comparator engines 354 are used to compare match information from N entries to the lookup key. Additionally, one or more remaining comparator engine(s) 354 are deactivated.

Referring now to FIGS. 3A and 3D, control information generated by the controller 304 indicates one or both of i) match information of how many retrieved entries should be compared to the lookup key, and ii) how many comparator engines 354 in the set 360 should be deactivated, if any, according to an embodiment. In one illustrative embodiment, the control information generated by the controller 304 includes the number of banks parameter, and the match identifier 350 is configured i) to receive the number of banks parameter, and ii) if N<P, to deactivate P-N comparator engines 354 so that N comparator engines 354 remain activated to compare match information from N retrieved entries to the lookup key.

In another embodiment, the match identifier 350 comprises a number of comparator engines 354 that is less than N for at least some values of N, and when the number of comparator engines 354 is less than N, at least some of the comparator engines 354 are time shared to compare match information of multiple retrieved entries to the lookup key. As merely an illustrative example, one comparator engine 354 is time shared to compare match information of multiple retrieved entries at different times to a same lookup key, according to an embodiment. In at least some such embodiments, if not all of the comparator engines 354 are needed to compare the match information of the N retrieved entries to the lookup key, one or more of the comparator engines 354 are deactivated to save power. In such embodiments, control information generated by the controller 304 indicates one or both of i) match information of how many retrieve entries should be compared to the lookup key by the match identifier 350, and ii) how many comparator engines 354 should be deactivated, if any, according to an embodiment. In one illustrative embodiment, the control information generated by the controller 304 includes the number of banks parameter, and the match identifier is configured i) to receive the number of banks parameter, and ii) when all of the comparator engines 354 are not needed to compare the match information of N retrieved entries to the lookup key, to deactivate an appropriate number of comparator engines 354.

In another embodiment, the match identifier 350 comprises a single comparator engine 354 that is time shared to compare match information of N retrieved entries to the lookup key. In at least some such embodiments, when N is decreased the single comparator engine 354 consumes less power as compared to when N is larger.

Figure 4:
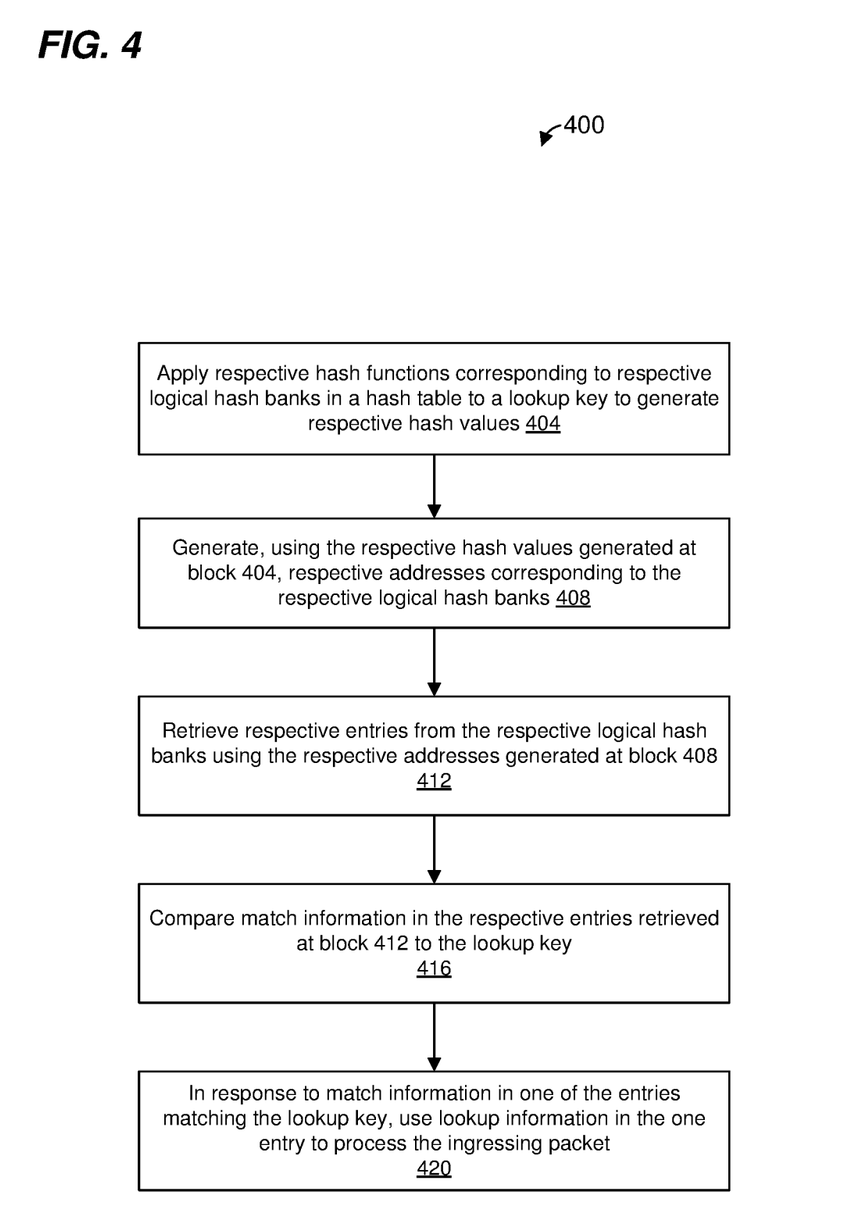
FIG. 4 is a flow diagram of an example method for looking up information in a hash table with a plurality of logical hash banks, according to an embodiment.

FIG. 4 is a flow diagram of an example method 400 for retrieving packet processing information in a hash table of a network device, the hash table including multiple logical hash banks, according to an embodiment. In an embodiment, a number N of logical hash banks in the hash table is configurable. In an embodiment, the method 400 is implemented by the network device 100 of FIG. 1. In other embodiments, the method 400 is implemented by another suitable network device different from the network device 100.

At block 404, the network device applies (e.g., the packet processor 102 applies, the hash generator 148 applies) using a plurality of respective hash functions to a lookup key to generate a plurality of hash values. In an embodiment, the lookup key corresponds to an ingressing packet, and the lookup key includes information from a header of the ingressing packet. In an embodiment, each hash function corresponds to a respective logical hash bank in the hash table. In an embodiment, a number of hash values generated at block 404 corresponds to the number N of logical hash banks in the hash table.

In an embodiment, the method 400 further comprises the network device generating the lookup key to include information from the header of the ingressing packet. In an embodiment, information from the header of the ingressing packet and included in the lookup key comprises one or more network addresses in the header of the ingressing packet, such as a destination network address and/or a source network address. In other embodiments, the information from the header of the ingressing packet and included in the lookup key additionally or alternatively comprises other header information such as a virtual local area network (VLAN) identifier. In an embodiment, the method 400 further comprises the network device generating the lookup key to include information not from the header of the ingressing packet but corresponding to the ingressing packet, such as a flow identifier assigned to the ingressing packet by the network device, the flow identifier indicating a flow of packets to which the ingressing packet belongs.

In an embodiment in which the network device includes a plurality of hash generator engines, the method 400 further includes deactivating one or more hash generator engines that are not needed for generating the hash values at block 404. For example, in an embodiment in which the network device includes P hash generator engines, where P is greater than N, P-N hash generator engines are deactivated.

At block 408, the network device generates (e.g., the packet processor 102 generates, the address calculator 152 calculates) a plurality of addresses using respective hash values generated at block 404. The plurality of addresses correspond to respective logical hash banks in the hash table, according to an embodiment. Generating the plurality of addresses at block 408 includes using i) a parameter N that specifies the number of banks in the hash table, and ii) N hash values generated by the hash generator. In an embodiment, a respective address space corresponds to each logical hash bank in the hash table, and generating the plurality of addresses at block 408 includes generating each address so that the generated address is within the address space of the corresponding logical hash table.

At block 412, the network device retrieves (e.g., the packet processor 102 retrieves, the memory interface 340 retrieves retrieves) a plurality of respective entries from the respective logical hash banks in the hash table using the respective addresses generated at block 408.

At block 416, match information in at least some of the respective entries retrieved at block 412 from the respective logical hash banks is compared to the lookup key.

In an embodiment in which the network device includes a plurality of comparator engines for comparing match information in retrieved entries to the lookup key, the method 400 further includes deactivating one or more comparator engines that are not needed for comparing match information in retrieved entries to the lookup key at block 616. For example, in an embodiment in which the network device includes P comparator engines, where P is greater than N, P-N comparator engines are deactivated.

In an embodiment, at block 420, in response to determining that the match information of one of the entries matches the lookup key, lookup information in the one entry is used to process the packet. As merely an illustrative embodiment, if entries in the hash table store forwarding information, block 420 includes using forwarding information from the one entry to make a forwarding decision regarding the ingressing packet.

The various blocks, operations, etc., described above may be implemented in hardware, such as in one or more custom integrated circuits, application specific integrated circuits (ASICs), field programmable gate arrays (FPGAs), etc., according to some embodiments. In other embodiments, some blocks, operations, etc., described above may be implemented, in whole or in part, using a processor executing machine-readable software and/or firmware instructions stored in a memory coupled to the processor.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A network device, comprising:
a plurality of ports;
a memory configured to store a hash table, the hash table including a plurality of logical hash banks, wherein a number of logical hash banks in the hash table is configurable; and
a packet processor coupled to the plurality of ports and to the memory, the packet processor configured to analyze ingressing packets and to make packet processing decisions for the ingressing packets, the packet processing decisions including a decision to forward an ingressing packet to one or more of the ports, wherein the packet processor comprises a hash-based lookup system, the hash-based lookup system comprising:
a hash generator configured to apply respective hash functions to a lookup key that includes packet header information from the ingressing packet, to generate respective hash values, wherein each hash function corresponds to a respective logical hash bank in the hash table, wherein a number of hash values generated by the hash generator corresponds to the number of logical hash banks, and wherein the number of hash values generated by the hash generator is configurable,
an address generator configured to generate respective addresses to the memory, the respective addresses within respective address spaces of respective logical hash banks of the hash table, wherein the address generator is configured to generate the respective addresses using i) a parameter N that specifies the number of logical hash banks in the hash table, and ii) N hash values generated by the hash generator, and
a match identifier configured to i) compare the lookup key with match information in entries respectively retrieved from N logical hash banks of the hash table using the respective addresses, to determine whether match information in any of the retrieved entries matches the lookup key, and ii) when match information in one of the retrieved entries matches the lookup key, output lookup information in the one entry.

2. The network device of claim 1, wherein the hash generator comprises:
a plurality of hash generator engines that are configured to apply the hash functions to the lookup key, to generate the hash values.

3. The network device of claim 2, wherein:
one or more of the hash generator engines among the plurality of hash generator engines are configurable to be deactivated to conserve power; and
the packet processor further comprises a controller that is configured to control the plurality of hash generator engines to deactivate one or more hash generator engines among the plurality of hash generator engines to conserve power when all of the hash generator engines are not required to generate the N hash values.

4. The network device of claim 3, wherein:
the hash generator includes P hash generator engines, and each hash generator engine is configured to apply a respective hash function; and
the controller is configured to, in response to N being less than P, control the plurality of hash generator engines to deactivate P-N hash generator engines among the plurality of hash generator engines to conserve power.

5. The network device of claim 1, wherein the match identifier comprises:
a plurality of comparator engines that are configured to compare the lookup key with match information in the N entries to determine whether match information in any of the N entries matches the lookup key.

6. The network device of claim 5, wherein:
one or more of the comparator engines among the plurality of comparator engines are configurable to be deactivated to conserve power; and
the packet processor further comprises a controller that is configured to control the plurality of comparator engines to deactivate one or more comparator engines among the plurality of comparator engines to conserve power when all of the comparator engines are not required to compare the lookup key to the match information in the N entries.

7. The network device of claim 6, wherein:
the match identifier includes P comparator engines, and each comparator engine is configured to compare the lookup key to a respective entry from a respective logical hash bank; and
the controller is configured to, in response to N being less than P, control the plurality of comparator engines to deactivate P-N comparator engines among the plurality of comparator engines to conserve power.

8. The network device of claim 1, wherein:
the parameter N is a first parameter;
a size of the hash table is configurable; and
the address generator is configured to generate the respective addresses further using a second parameter that specifies the size of the hash table.

9. The network device of claim 8, wherein the packet processor further comprises a controller that is configured to:
determine the first parameter;
determine the second parameter; and
control the address generator at least by providing the first parameter and the second parameter to the address generator.

10. The network device of claim 8, wherein:
the memory is a shared memory that stores other packet processing information used by the packet processor in addition to the hash table; and
the size of the hash table is configurable to permit different amounts of storage for the other packet processing information in the shared memory.

11. The network device of claim 1, wherein: the packet processor is configured to use the lookup information in the one entry to process the ingressing packet.

12. A method for looking up information in a hash table of a network device for processing an ingressing packet, wherein the hash table includes a plurality of logical hash banks, and wherein a number of logical hash banks in the hash table is configurable, the method comprising:
applying, at the network device, a plurality of hash functions to a lookup key that includes information from a header of the ingressing packet, wherein respective hash functions among the plurality of hash functions correspond to respective logical hash banks in the hash table;
generating, at the network device, a plurality of addresses to a memory that stores the hash table, wherein respective addresses among the plurality of addresses are within respective address spaces of respective logical hash banks of the hash table, and wherein generating the respective addresses includes using i) a parameter N that specifies the number of logical hash banks in the hash table, and ii) N hash values;
retrieving, at the network device, entries from N logical hash banks of the hash table using the respective addresses;
comparing, at the network device, the lookup key with match information in the retrieved entries to determine whether match information in any of the retrieved entries matches the lookup key; and
in response to match information in one of the retrieved entries matching the lookup key, using lookup information in the one entry to process the ingressing packet.

13. The method of claim 12, wherein applying the plurality of hash functions comprises:
using a plurality of hash generator engines to apply the plurality of hash functions to the lookup key.

14. The method of claim 13, further comprising:
deactivating one or more hash generator engines among the plurality of hash generator engines to conserve power when all of the hash generator engines are not required to generate the N hash values.

15. The method of claim 14, wherein:
the network device includes P hash generator engines, and each hash generator engine is configured to apply a respective hash function; and
the method further comprises: in response to N being less than P, deactivating P-N hash generator engines among the plurality of hash generator engines to conserve power.

16. The method of claim 12, wherein comparing the lookup key with match information in the N entries comprises:
using a plurality of comparator engines to compare the lookup key with match information in the N entries to determine whether match information in any of the N entries matches the lookup key.

17. The method of claim 16, further comprising:
deactivating one or more comparator engines among the plurality of comparator engines to conserve power when all of the comparator engines are not required to compare the lookup key to the match information in the N entries.

18. The method of claim 17, wherein:
the network device includes P comparator engines, and each comparator engine is configured to compare the lookup key to a respective entry from a respective logical hash bank; and
the method further comprises: in response to N being less than P, deactivating P-N comparator engines among the plurality of comparator engines to conserve power.

19. The method of claim 12, wherein:
the parameter N is a first parameter;
a size of the hash table is configurable; and
generating the respective addresses comprises further using a second parameter that specifies the size of the hash table.

20. The method of claim 19, further comprising:
determining, at the network device, the first parameter;
determining, at the network device, the second parameter; and
providing the first parameter and the second parameter to an address generator that generates the plurality of addresses.

* * * * *